(12) United States Patent
Warther

(10) Patent No.: US 8,636,220 B2
(45) Date of Patent: Jan. 28, 2014

(54) PRINTED PLANAR RFID ELEMENT WRISTBANDS AND LIKE PERSONAL IDENTIFICATION DEVICES

(75) Inventor: Richard O. Warther, West Chester, PA (US)

(73) Assignee: Vanguard Identification Systems, Inc., West Chester, PA (US)

( * ) Notice: Subject to any disclaimer, the term of this patent is extended or adjusted under 35 U.S.C. 154(b) by 1462 days.

(21) Appl. No.: 11/967,502

(22) Filed: Dec. 31, 2007

(65) Prior Publication Data

US 2009/0009412 A1    Jan. 8, 2009

Related U.S. Application Data

(60) Provisional application No. 60/882,623, filed on Dec. 29, 2006.

(51) Int. Cl.
*G06K 19/06* (2006.01)

(52) U.S. Cl.
USPC .......................................... 235/492; 235/487

(58) Field of Classification Search
USPC ................................................. 235/487, 492
See application file for complete search history.

(56) References Cited

U.S. PATENT DOCUMENTS

| | | |
|---|---|---|
| 3,237,970 A | 3/1966 | Mudd |
| 3,537,195 A | 11/1970 | Gerds |
| 3,609,858 A | 10/1971 | Shaw |
| 4,157,540 A | 6/1979 | Oros |
| 4,212,393 A | 7/1980 | Lenkoff |
| 4,333,072 A | 6/1982 | Beigel |
| 4,443,027 A | 4/1984 | McNeely et al. |
| 4,549,264 A | 10/1985 | Carroll et al. |
| 4,560,445 A | 12/1985 | Hoover et al. |
| 4,578,572 A | 3/1986 | Hice |
| 4,598,275 A | 7/1986 | Ross et al. |
| 4,645,916 A | 2/1987 | Raisleger |
| 4,658,357 A | 4/1987 | Carroll et al. |
| 4,682,415 A | 7/1987 | Adell |
| 4,694,283 A | 9/1987 | Reeb |
| 4,717,177 A | 1/1988 | Boram |

(Continued)

FOREIGN PATENT DOCUMENTS

| | | |
|---|---|---|
| CA | 2300241 A1 | 9/2000 |
| EP | 0024344 A1 | 3/1981 |

(Continued)

OTHER PUBLICATIONS

EP Patent Application 07255085.8; European Search Report dated Feb. 27, 2009, 10 pages.

(Continued)

*Primary Examiner* — Daniel St Cyr
(74) *Attorney, Agent, or Firm* — Panitch Schwarze Belisario & Nadel LLP

(57) ABSTRACT

Each personal identification device includes a planar identification element with at least a core of flexible, porous and preferably microvoided polymer sheet material and a planar RFID assembly encoded with a unique electro/magnetic code permanently and integrally joined together with the core. The sheet material is sufficiently porous to collapse around the core so the sheet product remains planar yet flexible. A separate carrier can be provided or devices can be made in batches with scoring define one or more individual RFID devices removable from a remainder of a sheet product.

21 Claims, 7 Drawing Sheets

(56) References Cited

U.S. PATENT DOCUMENTS

| | | |
|---|---|---|
| 4,717,438 A | 1/1988 | Benge et al. |
| 4,807,908 A | 2/1989 | Gerbel |
| 4,851,815 A | 7/1989 | Enkelmann |
| 4,857,893 A | 8/1989 | Carroll |
| 4,861,644 A | 8/1989 | Young et al. |
| D310,849 S | 9/1990 | Davis |
| 4,973,944 A | 11/1990 | Maletta |
| 4,978,146 A | 12/1990 | Warther et al. |
| 4,998,753 A | 3/1991 | Wichael |
| 5,020,581 A | 6/1991 | Gutierrez |
| 5,032,823 A | 7/1991 | Bower et al. |
| 5,106,124 A | 4/1992 | Volkman et al. |
| 5,115,223 A | 5/1992 | Moody |
| 5,166,501 A | 11/1992 | Woolley |
| 5,204,513 A | 4/1993 | Steele |
| 5,218,343 A | 6/1993 | Stobbe et al. |
| 5,233,167 A | 8/1993 | Markman et al. |
| 5,340,968 A | 8/1994 | Watanabe et al. |
| 5,345,231 A | 9/1994 | Koo et al. |
| 5,366,249 A | 11/1994 | Diemert |
| 5,381,137 A | 1/1995 | Ghaem et al. |
| 5,430,441 A | 7/1995 | Bickley et al. |
| 5,444,223 A | 8/1995 | Blama |
| 5,446,447 A | 8/1995 | Carney et al. |
| 5,448,110 A | 9/1995 | Tuttle et al. |
| 5,478,991 A | 12/1995 | Watanabe et al. |
| 5,492,558 A | 2/1996 | Miller et al. |
| 5,493,805 A | 2/1996 | Penuela et al. |
| 5,495,981 A | 3/1996 | Warther |
| 5,497,140 A | 3/1996 | Tuttle |
| 5,503,665 A | 4/1996 | Miller et al. |
| 5,512,879 A | 4/1996 | Stokes |
| 5,528,222 A | 6/1996 | Moskowitz et al. |
| 5,529,345 A | 6/1996 | Kohls |
| 5,531,482 A | 7/1996 | Blank |
| 5,560,970 A | 10/1996 | Ludeb uhl |
| 5,574,470 A | 11/1996 | de Vall |
| 5,581,257 A | 12/1996 | Greene et al. |
| 5,609,716 A | 3/1997 | Mosher, Jr. |
| 5,615,504 A | 4/1997 | Peterson et al. |
| 5,624,514 A | 4/1997 | Frowein |
| 5,646,592 A | 7/1997 | Tuttle |
| 5,660,663 A | 8/1997 | Chamberlain et al. |
| 5,662,976 A | 9/1997 | Popat et al. |
| 5,682,143 A | 10/1997 | Brady et al. |
| 5,693,766 A | 12/1997 | Bradbury |
| 5,708,419 A | 1/1998 | Isaacson et al. |
| 5,719,586 A | 2/1998 | Tuttle |
| 5,743,567 A | 4/1998 | Warther |
| 5,769,457 A | 6/1998 | Warther |
| 5,772,585 A | 6/1998 | Lavin et al. |
| 5,776,278 A | 7/1998 | Tuttle et al. |
| 5,781,110 A | 7/1998 | Habeger, Jr. et al. |
| 5,798,984 A * | 8/1998 | Koch ........................... 368/10 |
| 5,799,426 A | 9/1998 | Peterson |
| 5,823,948 A | 10/1998 | Ross, Jr. et al. |
| 5,838,253 A | 11/1998 | Wurz et al. |
| 5,863,016 A | 1/1999 | Makwinski et al. |
| 5,863,076 A | 1/1999 | Warther |
| 5,868,430 A | 2/1999 | Kolosvary |
| 5,883,576 A | 3/1999 | De La Huerga |
| 5,912,981 A | 6/1999 | Hansmire et al. |
| 5,935,308 A | 8/1999 | Siddiqui et al. |
| 5,939,181 A | 8/1999 | Kumano et al. |
| 5,963,134 A | 10/1999 | Bowers et al. |
| 5,973,598 A | 10/1999 | Beigel |
| 5,973,600 A | 10/1999 | Mosher, Jr. |
| 5,979,941 A | 11/1999 | Mosher, Jr. et al. |
| 5,997,042 A | 12/1999 | Blank |
| 6,010,159 A | 1/2000 | Warther |
| 6,039,356 A | 3/2000 | Warther et al. |
| 6,050,605 A | 4/2000 | Mikelionis et al. |
| 6,050,622 A | 4/2000 | Gustafson |
| 6,078,791 A | 6/2000 | Tuttle et al. |
| 6,089,611 A | 7/2000 | Blank |
| 6,095,567 A | 8/2000 | Buell |
| 6,099,043 A | 8/2000 | Story |
| 6,104,311 A | 8/2000 | Lastinger |
| 6,124,377 A | 9/2000 | Kaiser et al. |
| 6,144,303 A | 11/2000 | Federman |
| 6,181,287 B1 | 1/2001 | Beigel |
| 6,192,253 B1 | 2/2001 | Charlier et al. |
| 6,278,413 B1 | 8/2001 | Hugh et al. |
| 6,290,138 B1 | 9/2001 | Ohno et al. |
| 6,305,716 B1 | 10/2001 | Warther et al. |
| 6,325,294 B2 | 12/2001 | Tuttle et al. |
| 6,404,341 B1 | 6/2002 | Reid |
| D461,477 S | 8/2002 | Pentz |
| 6,441,736 B1 | 8/2002 | Leighton |
| D462,966 S | 9/2002 | Pentz et al. |
| 6,457,643 B1 | 10/2002 | Way |
| 6,471,127 B2 | 10/2002 | Pentz et al. |
| 6,484,947 B1 * | 11/2002 | Miyata ........................ 235/492 |
| D467,247 S | 12/2002 | Pentz |
| 6,581,824 B1 | 6/2003 | McClure et al. |
| 6,588,658 B1 | 7/2003 | Blank |
| 6,667,092 B1 | 12/2003 | Brollier et al. |
| 6,674,923 B1 | 1/2004 | Shih et al. |
| 6,693,544 B1 | 2/2004 | Hebbecker |
| 6,700,493 B1 | 3/2004 | Robinson |
| 6,724,690 B1 | 4/2004 | Endo et al. |
| 6,769,718 B1 | 8/2004 | Warther et al. |
| 6,779,727 B2 | 8/2004 | Warther |
| 6,782,648 B1 | 8/2004 | Mosher, Jr. |
| 6,784,017 B2 | 8/2004 | Yang et al. |
| 6,836,215 B1 | 12/2004 | Laurash et al. |
| 6,888,502 B2 | 5/2005 | Beigel et al. |
| 6,924,688 B1 | 8/2005 | Beigel |
| 6,924,781 B1 | 8/2005 | Gelbman |
| 6,942,155 B1 | 9/2005 | Stewart et al. |
| 6,971,200 B2 | 12/2005 | Valenti, Jr. |
| 6,992,952 B2 | 1/2006 | Endo et al. |
| 6,994,262 B1 * | 2/2006 | Warther ...................... 235/492 |
| 7,022,385 B1 | 4/2006 | Nasser |
| 7,042,360 B2 | 5/2006 | Light et al. |
| 7,071,826 B2 | 7/2006 | Peterson |
| 7,109,871 B2 | 9/2006 | Lentine et al. |
| 7,119,690 B2 | 10/2006 | Lerch et al. |
| 7,144,470 B2 | 12/2006 | Duschek et al. |
| 7,153,620 B2 | 12/2006 | Aylward et al. |
| 7,187,055 B2 | 3/2007 | Beigel |
| 7,188,764 B2 | 3/2007 | Penuela |
| 7,193,504 B2 | 3/2007 | Carrender et al. |
| 7,204,425 B2 | 4/2007 | Mosher, Jr. et al. |
| 7,204,652 B2 | 4/2007 | Warther |
| 7,207,488 B2 | 4/2007 | Hammerslag et al. |
| 7,225,993 B2 | 6/2007 | Warther |
| 7,230,519 B2 | 6/2007 | Coughlin et al. |
| 7,233,250 B2 | 6/2007 | Forster |
| 7,236,151 B2 | 6/2007 | Doane et al. |
| 7,240,446 B2 | 7/2007 | Bekker |
| 7,316,358 B2 | 1/2008 | Kotik et al. |
| 7,327,251 B2 | 2/2008 | Corbett, Jr. |
| 7,375,638 B2 | 5/2008 | Light et al. |
| 7,377,445 B1 | 5/2008 | Stewart et al. |
| 7,377,447 B2 | 5/2008 | Oberle |
| 7,450,012 B2 | 11/2008 | Harmon |
| 7,454,855 B2 | 11/2008 | Kotik et al. |
| 7,479,940 B2 | 1/2009 | Marhefka |
| 7,520,078 B2 | 4/2009 | Ali et al. |
| 7,584,896 B2 | 9/2009 | Warther |
| RE41,925 E | 11/2010 | Warther |
| 7,845,569 B1 | 12/2010 | Warther et al. |
| 7,909,955 B2 | 3/2011 | Warther |
| 8,052,061 B2 | 11/2011 | Warther |
| 8,235,300 B2 | 8/2012 | Warther |
| 2001/0023014 A1 | 9/2001 | Patel et al. |
| 2002/0084325 A1 | 7/2002 | Reardon |
| 2002/0087394 A1 | 7/2002 | Zhang |
| 2003/0016122 A1 | 1/2003 | Petrick |
| 2003/0042317 A1 | 3/2003 | Behm et al. |
| 2003/0042731 A1 | 3/2003 | Li |
| 2003/0173408 A1 | 9/2003 | Mosher et al. |
| 2003/0174049 A1 | 9/2003 | Beigel et al. |

(56) References Cited

U.S. PATENT DOCUMENTS

| | | |
|---|---|---|
| 2004/0090868 A1* | 5/2004 | Endo et al. .................. 368/10 |
| 2004/0091659 A1 | 5/2004 | Banks et al. |
| 2004/0104274 A1 | 6/2004 | Kotik et al. |
| 2004/0111335 A1 | 6/2004 | Black et al. |
| 2004/0111942 A1 | 6/2004 | Stonehocker |
| 2004/0119593 A1 | 6/2004 | Kuhns |
| 2004/0188010 A1 | 9/2004 | Chaoui |
| 2005/0097896 A1 | 5/2005 | Critchley et al. |
| 2005/0108912 A1 | 5/2005 | Bekker |
| 2005/0134461 A1 | 6/2005 | Gelbman et al. |
| 2005/0146435 A1 | 7/2005 | Girvin et al. |
| 2005/0184874 A1 | 8/2005 | Mosher |
| 2005/0205202 A1 | 9/2005 | Chaoui et al. |
| 2006/0019745 A1 | 1/2006 | Benbrahim |
| 2006/0032907 A1 | 2/2006 | Zercher |
| 2006/0037502 A1* | 2/2006 | Warther .................. 101/232 |
| 2006/0076402 A1 | 4/2006 | Lerch et al. |
| 2006/0077060 A1 | 4/2006 | Lerch et al. |
| 2006/0087437 A1 | 4/2006 | Lerch et al. |
| 2006/0091671 A1 | 5/2006 | Raming |
| 2006/0124757 A1 | 6/2006 | Warther |
| 2006/0129308 A1 | 6/2006 | Kates |
| 2006/0192674 A1 | 8/2006 | Roberta |
| 2006/0200674 A1 | 9/2006 | Welker et al. |
| 2006/0230661 A1 | 10/2006 | Bekker |
| 2007/0008138 A1 | 1/2007 | Mosher et al. |
| 2007/0012771 A1 | 1/2007 | Singleton |
| 2007/0018832 A1 | 1/2007 | Beigel et al. |
| 2007/0026144 A1 | 2/2007 | Park et al. |
| 2007/0028495 A1 | 2/2007 | Kotik et al. |
| 2007/0120687 A1 | 5/2007 | Lerch et al. |
| 2007/0152826 A1 | 7/2007 | August et al. |
| 2007/0159332 A1 | 7/2007 | Koblasz |
| 2007/0194129 A1 | 8/2007 | Jones |
| 2007/0199988 A1 | 8/2007 | Labgold et al. |
| 2007/0215711 A1 | 9/2007 | Warther |
| 2008/0030017 A1 | 2/2008 | Warther |
| 2008/0099723 A1 | 5/2008 | Nose et al. |
| 2008/0236011 A1 | 10/2008 | Bekker |
| 2008/0273023 A1 | 11/2008 | Nose et al. |
| 2008/0290176 A1 | 11/2008 | Fleet |
| 2009/0040048 A1 | 2/2009 | Locker et al. |
| 2010/0065648 A1 | 3/2010 | Warther |
| 2010/0079416 A1 | 4/2010 | Chung et al. |
| 2011/0133904 A1 | 6/2011 | Warther |

FOREIGN PATENT DOCUMENTS

| | | |
|---|---|---|
| EP | 1744275 A1 | 1/2007 |
| WO | WO8404493 | 11/1984 |
| WO | WO-8404493 A1 | 11/1984 |
| WO | WO 8907052 A1 | 8/1989 |
| WO | WO-2006052422 | 5/2006 |
| WO | WO-2007011514 | 1/2007 |

OTHER PUBLICATIONS

U.S. Appl. No. 12/951,749, filed Nov. 22, 2010, Warther.
U.S. Appl. No. 12/912,846, filed Oct. 27, 2010, Warther.

* cited by examiner

PRINTED PLANAR RFID ELEMENT WRISTBANDS AND LIKE PERSONAL IDENTIFICATION DEVICES

CROSS-REFERENCE TO RELATED APPLICATIONS

This application is related to U.S. patent Application Ser. No. 60/882,623 filed Dec. 29, 2006, and incorporated by reference herein in its entirety.

BACKGROUND OF THE INVENTION

The present invention relates to sheet products and, in particular, to printed form sheet products with RFID capabilities used for or in personal identification devices.

BRIEF SUMMARY OF THE INVENTION

In one aspect, the invention is a personal identification device comprising: a planar radio frequency identification element, the element including a flexible core having opposing first and second major opposing outer sides and formed from at least one strip of a flexible, microvoided, polymer sheet material, and a planar radio frequency transponder assembly including a planar electro/magnetic data storage element and a planar antenna permanently and integrally fixed with at least an inner major side of the flexible, porous polymer sheet material, the at least one microvoided, polymer sheet material core strip varying in thickness in the element, the at least one flexible, porous polymer sheet material core strip being thinned over the planar radio frequency transponder assembly in comparison to thicknesses of the at least one flexible, porous polymer sheet material core strip adjoining the planar radio frequency transponder assembly; and carrier means configured for holding the planar radio frequency identification element and for releasably securing the planar radio frequency identification element to a user to be identified by the planar radio frequency identification element.

In another aspect, the invention is a method of making a personal identification device comprising the steps of: providing an at least generally planar RFID element including first and second opposing major planar outer sides with indicia printed on at least one of the outer sides; providing a plastic band having an RFID element holder and at least a first strap extending away from the RFID element holder; and securing the generally planar RFID element to band at the RFID element holder.

In yet another aspect, the invention preferably is an RFID element made by a method comprising the steps of: printing indicia on a first side of a first flexible planar substrate sheet having major opposing first and second sides and uniform thickness between the major sides; applying a first one of either a radio frequency identification array antenna and a radio frequency identification array printed circuit chip to the second major side of the first planar substrate sheet; separately applying a second, remaining one of the radio frequency identification array antenna and the radio frequency identification array printed circuit chip to the second major side of the first planar substrate sheet in operative overlying relationship and in connection with the first applied one to form an operative radio frequency identification array on the first planar substrate sheet; fixedly and permanently joining a first major outer side of a second planar substrate sheet to the first major side of the first planar substrate sheet overlying the applied antenna and printed circuit chip to form at least part of a multilayer planar core having first and second major outer sides, at least one of the first and second planar substrate sheets being microvoided; fixedly and permanently applying at least a first planar cover sheet to at least the first major outer side of the planar core; and scoring the planar core and at least first planar cover sheet to define at least one multilayer, integral, individual planar radio frequency identification element removable from the core and at least first planar cover sheet, the planar radio frequency identification element containing the operative radio frequency identification array and the planar radio frequency identification element having opposing major planar sides fitting into an area no greater that about three and five-eighths by about two and three-eighths inches.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings, which are at least partially diagrammatic.

DETAILED DESCRIPTION OF THE INVENTION

Figure 1:
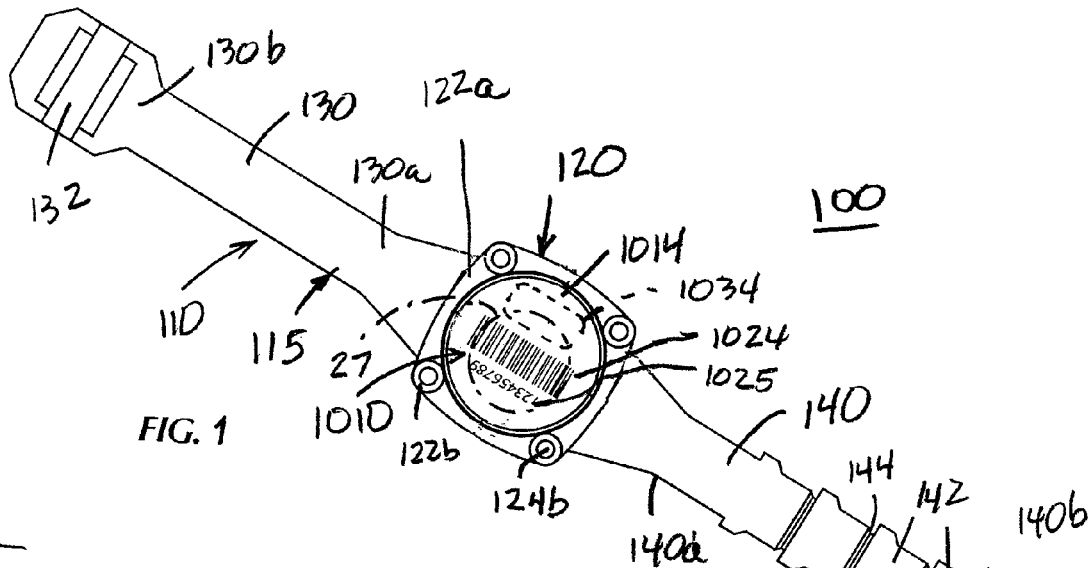
FIG. 1 is a perspective view of an exemplary preferred wristband of the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the stated component and designated parts thereof. The terminology includes the words above specifically mentioned, derivatives thereof and words of similar import. Furthermore, the term "electro/magnetic" is used to refer generally to devices that are electrical or magnetic or both and other than photonic in character, function and/or data storage or transmission.

Figure 2:
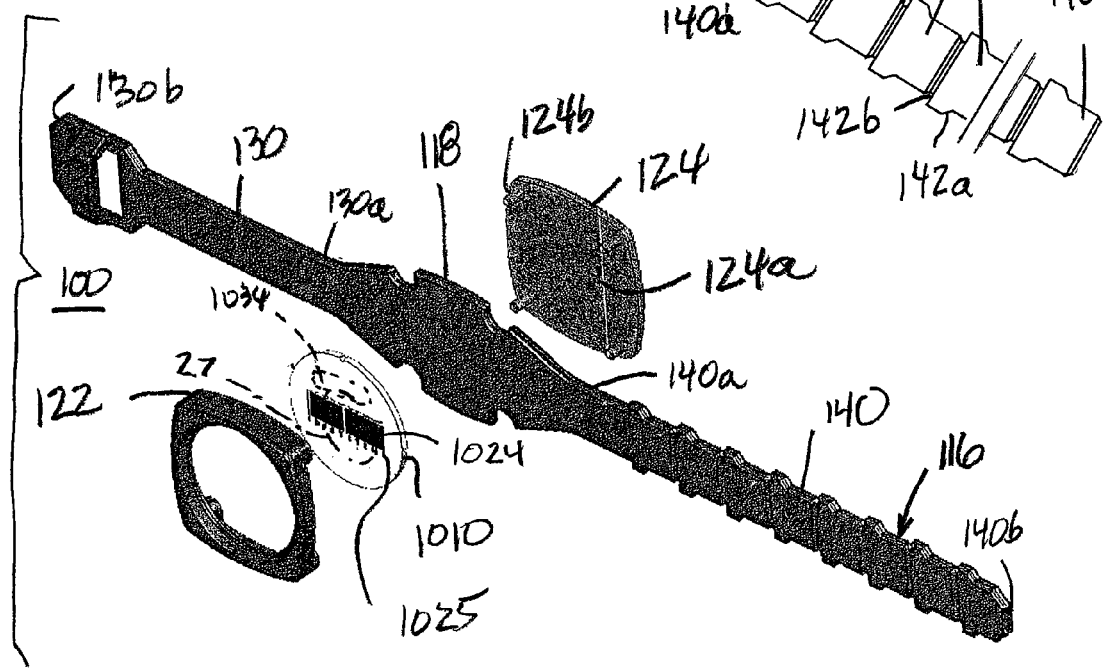
FIG. 2 is an exploded view of the wristband of FIG. 1.

In the drawings, like numerals indicate like elements. FIGS. 1 and 2 depict a presently preferred embodiment wristband type identification device of the present invention indicated generally at 100. Device 1000 includes a planar radio frequency identification ("RFID") element 10 with planar radio frequency transponder assembly indicated diagrammatically in phantom at 27 and a carrier 110, which is a remainder of the device 1000 and is configured to receive and hold the printed planar radio frequency identification element 1010 and releasably secure the planar radio frequency identification element 1010 to a user (not depicted) who can be uniquely identified by the planar radio frequency identification element 1010 when properly interrogated or polled. The carrier 110 includes a relatively enlarged holder portion or simply "holder" indicated generally at 120 and an attachment portion indicated generally at 115 connected with the holder 120 and configured to releasably secure the holder 120 to the user. Attachment portion 115 includes at least one strap portion or simply "strap" 130 and, in this embodiment, a second strap 140. The holder 120 is configured to receive and hold the printed planar radio frequency identification element 1010. The straps 130, 140 are collectively configured at least by sizing and shaping to releasably secure the printed planar radio frequency identification element 1010 in holder 120 to a user (not depicted). Strap 130 has a first end 130a secured and with the holder 120. Second strap 140 has a first end 140a that in this embodiment is also secured with the holder 120 on a side of the holder 120 opposite from the at least one end 130a.

FIG. 2 depicts a presently preferred construction of device 100. The straps 130, 140 are preferably formed in a one piece band 116 with a third portion, a central portion 118, monolithically and fixedly connected with the first ends 130a, 140a of the first and second strap portions 130, 140. Holder 120 preferably is provided by two half shell portions, a front half 122 and a rear half 124 secured around the central portion 118 of the band 116. The halves 122, 124 may be joined by any of a variety of known connections. Preferably, back half 124 is provided with a back wall 124a supporting a plurality of posts 124b, which are sized to be received in a plurality of opposing bores 122b (in FIG. 1 with ends of posts 124b) supported at the outer corners of the front wall 122a of front half 122. The posts 124b are held in the bores 122b in any of several different ways. The posts 124b are preferably adhesively joined or solvent or ultrasonically welded with the bores 122b. The posts 124b and bores 122b can alternatively (or additionally) be configured for snap or friction (press) securement or screws can be passed through back wall 124a and substituted for posts 124b to be received in bores 122b. Preferably, central portion 118 of band 116 is generally the same shape as the shell halves 122, 124 and is sized sufficiently large to require the provision of cutouts 118a at its corners to pass posts 124b and provide an interference engagement between the band 116 and holder 120, thereby preventing the band 116 from being slid from the holder 120. The planar radio frequency identification element 1010 is preferably captured within holder 120 between the front half 122 and the band 118.

Though not required for RFID operation, the front half shell 122 can be provided with an opening 122c to expose at least a portion a central of one major planar outer side 1014 of the planar radio frequency identification element 1010, preferably a side bearing printed indicia or other printing indicated generally at 1022. The printing 1022 may include one or more static fields 1034 (in phantom), which would not contain data that could be used to identify either the planar radio frequency identification element 1010 or the user to whom it was assigned. It typically would but does not have to be repeated identically on multiple other copies of the element. Element 1010 preferably does include one or more variable data fields, two being indicated at 1024 and 1025. Variable date field with 1025 is preferably printed with machine readable bar code indicia that contains a unique code that is the same as or that can at least can be cross referenced against the code of the RFID signal generated by the element 1010 to uniquely identify the element 1010 and/or its assigned user. Variable data field 1024 preferably is printed with legible (human readable) alphanumeric characters that may represent the same code as that of the bar code variable data field 1025 or the same code as the code of the RFID signal or yet some other code that at least can be cross-referenced against the RFID and/or bar code(s). Preferably the variable data fields 1024, 1025 are encoded with the same unique code that uniquely identify the device 100 and its element 1010 from other like devices and elements and thereby uniquely identify one user to whom the code(s) and device are provided or otherwise assigned.

Band 116 is preferably at least about 15 cm (6 inches) long and preferably adjustable in total length but could be longer and/or of different form for releasable securement around the leg, arm, neck (including a necklace), head or even waist of the user. Preferably, strap portion 130 is provided with a slide catch 132 at its distal, free end 130b of the type now commonly found in use on various plastic slide ties (e.g. cable ties, fence ties, etc.). Strap portion 140 is further preferably provided at its opposing, second distal free end 140b with a series of serrations 142 each having sloping front surfaces 142a for slide entry into and through the catch and transverse end surfaces 142b for interference with the catch 132 preventing strap end 140b from being backed out of the catch 132. Strap portion 140 can also be provided with transverse grooves 144 or other lines of weakness to permit the removal of any desired amount of excess strap 140 from the free end 140b.

Figure 3:
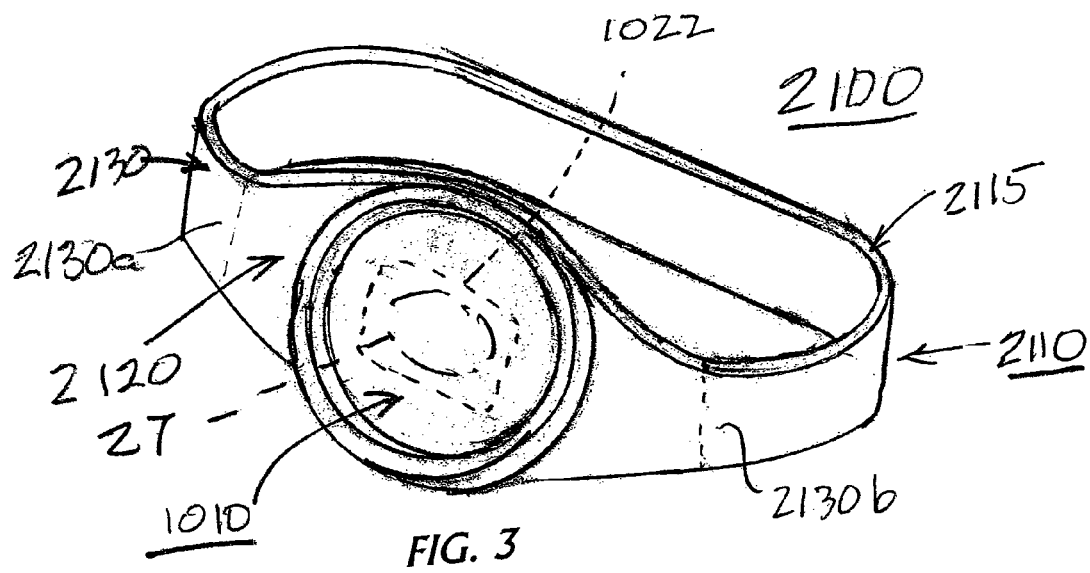
FIG. 3 is a perspective view of a first alternate embodiment exemplary wristband of the present invention.
Figure 4:
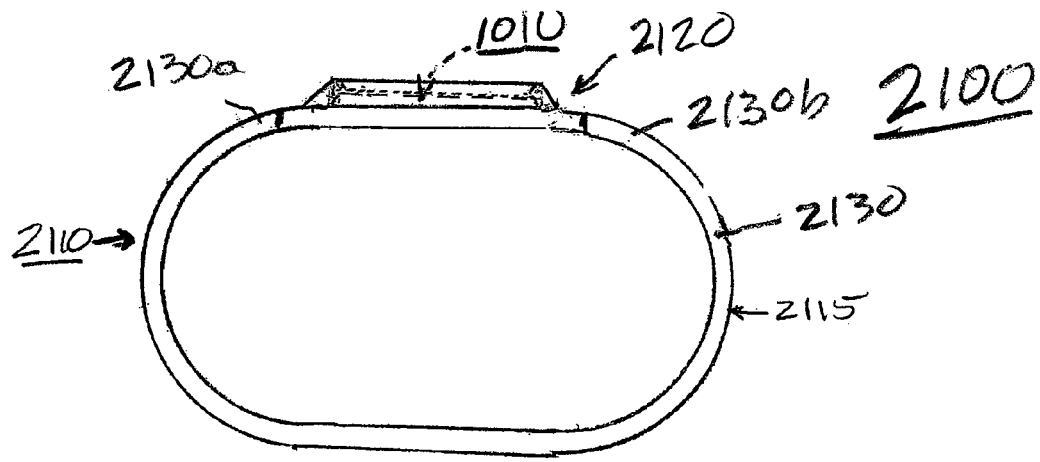
FIG. 4 is a side elevation view of the wristband of FIG. 3.

FIGS. 3 and 4 depict a first alternate embodiment personal RFID device of the present invention in the form of a wristband indicated generally at 2100, with carrier 2110 carrying a planar RFID element 1010 of FIGS. 1-2. Carrier 2110 includes a central, planar RFID element holder portion or simply "holder" indicated generally at 2120 and an attachment portion indicated generally at 2115 in the form of one strap portion or strap 2130 having at least one end, a first end 2130a, secured and preferably fixed with the holder 2120, a remainder of the strap extending away from the first end 2130a. The strap 2130 has a second end 2130b that is also be secured and fixed with the holder 2120 on a side of the holder opposite from the at least one end 2130a. The strap 2130 is preferably at least partially expandable. It may be provided with an expandable portion (not depicted) or, more preferably, the holder 2120 and strap 2130 are formed together in one continuous, unbroken piece from an expandable material such as being molded in one band (also indicated by 2115) from a thermoplastic elastomeric (TPE) like a silicone or ethylene propylene diene monomer (EPDM) rubber. The exposed side 1014 of the RFID element 1010 bears visible printing (indicated diagrammatically by phantom box 1022), the contents of which have already been discussed.

Figure 5:
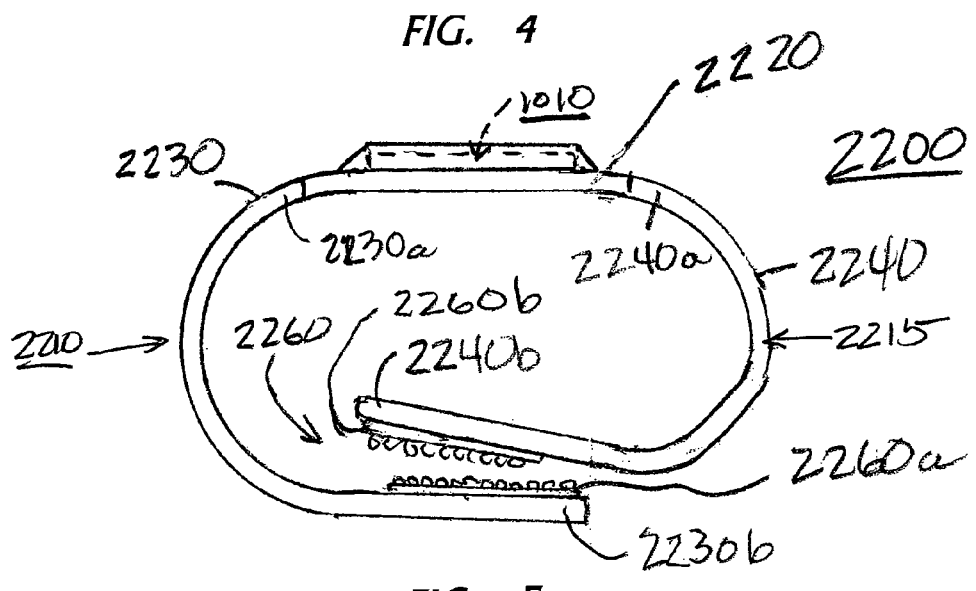
FIG. 5 is a side elevation view of a second alternate embodiment, exemplary wristband of the present invention.
Figure 6:
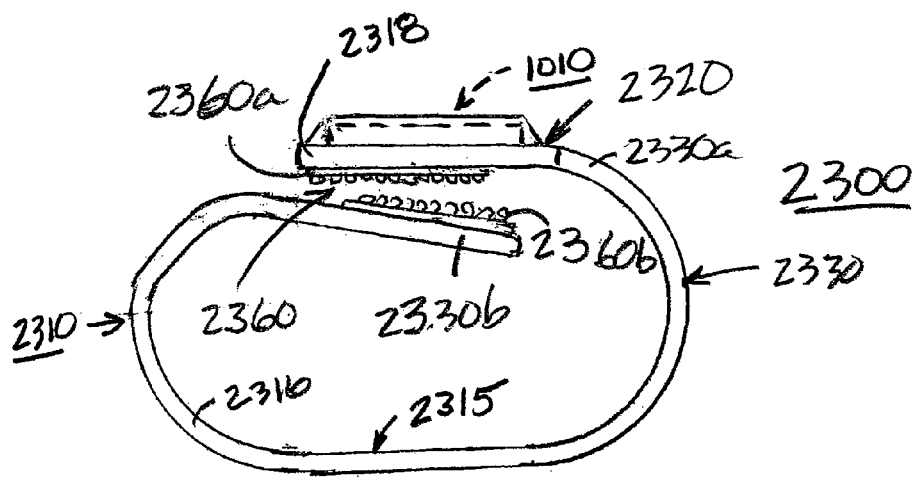
FIG. 6 is a side elevation view of a third alternate embodiment, exemplary wristband of the present invention.

Referring to FIG. 5, a second alternate embodiment RFID wristband type personal identification device of the present invention is indicated at 2200 with a planar RFID element 1010 and a carrier 2210 having a central holder portion (i.e. "holder") 2220 and an attachment portion 2215 including first and second strap portions or straps, 2230, 2240, each having a first end 2230a, 2240a secured and preferably fixed with the central holder 2220, and a second, free end 2230b, 2240b extending away from the holder 2210 and the fixed end of the strap. Where two straps 2230, 2240 are provided and each strap has one end attached to the holder 2220 (e.g. 2230a, 2240a) and one opposite, free end (e.g. 2230b, 2240b), a fastening may be provided to form a closed loop with free ends 2230b, 2240b to at least temporarily or releasably secure the loop around part of a user. One such temporary fastening is indicated generally at 2260 in FIG. 35 and includes two, releasably mating portions 2260a, 2260b, which are loop and hook portions, respectively, of a releasable flexible fabric strip known as Velcro FIG. 6 depicts a third alternate embodiment RFID wristband type of personal identification device of the present invention indicated generally at 2300 with a planar RFID element 1010 and a carrier portion 2310 having a holder portion ("holder") 2320 and an attachment portion 2315 in the form of a one piece band 2316 with enlarged portion 2318 and a single strap 2330 having a first end 2330a secured and preferably fixed with the enlarged central portion 2318 of holder 2320 and a second free end 2330b. Again, a releasable fabric strip fastening 2360 is provided, this time with a first one of the two portions 2360a, 2360b attached to an underside of the holder 2230 opposite the upper side of the holder 2320 on which the RFID element 1010 is displayed, and a second, remaining one of the portions 2360a, 2360b attached to a surface of the strap 2330 at or at least proximal to its second end 2330b where it underlies and faces the underside of the enlarged central portion 238 of holder 2320 and the first fastening portion 2360a. The second end 2330b is held on a user's wrist and the remainder of the device 2300 is wrapped around the user's wrist and onto the second end 2330b sufficiently for the fastening portions 2360a, 2360b to overlap in facing, juxtaposed orientation and releasably mate.

Figure 7:
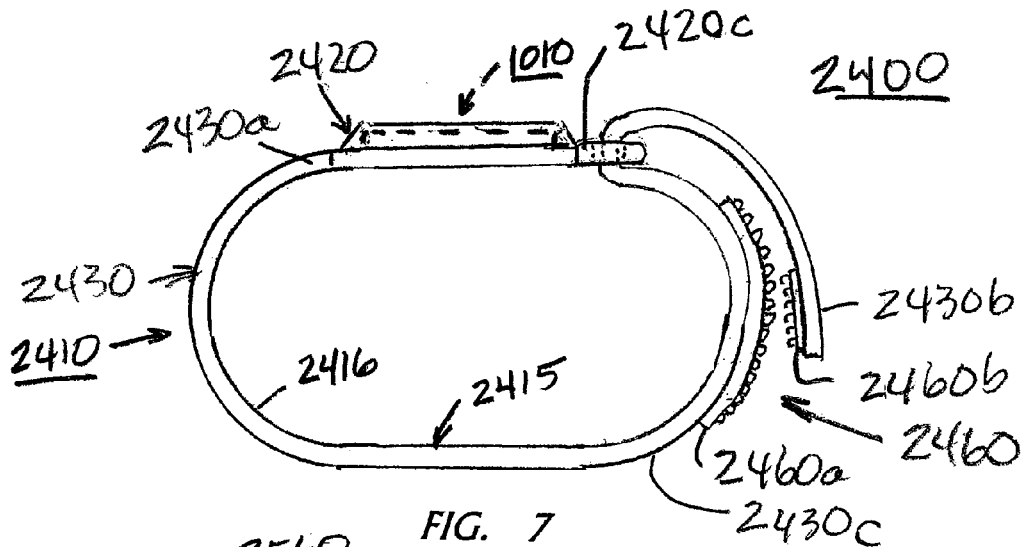
FIG. 7 is a side elevation view of a fourth alternate embodiment, exemplary wristband of the present invention.

FIG. 7 depicts a fourth alternate embodiment RFID wristband type personal identification device of the present invention indicated generally at 2400 with a planar RFID element 1010 and a carrier portion 2410 including a holder 2420 and an attachment portion 2415 including a one piece band 2416 with enlarged portion 2418 and one strap 2430, which is a slight variation of the third alternate embodiment. The holder 2420 is provided with a loop 2420c on an outer edge of the holder 2420 opposite the edge to which the first end 2430a of the strap 2430 is fixed and preferably part of a one-piece band 2316. Mating first and second portions 2460a, 2460b of the flexible fabric releasable fastening 2460 are again provided, a first releasable fastening portion 2460b on one major side 2430c of the strap 2430 at or at least proximal to the second, free end 2430b of the strap. A second, remaining fastening portion 2460a is also provided on the one major side 2430c of the strap 2430 proximal to the second, free end 2430b of the strap but spaced inwardly or more proximal to end 2430a along the strap 2430 from the first releasable fastening portion 2460b. The distal end 2430b of the strap can be threaded through loop 2420c of the holder 2420 and doubled back upon itself so that the fastening portions 2460a, 2460b are in facing juxtaposed position to releasably engage.

Figure 8:
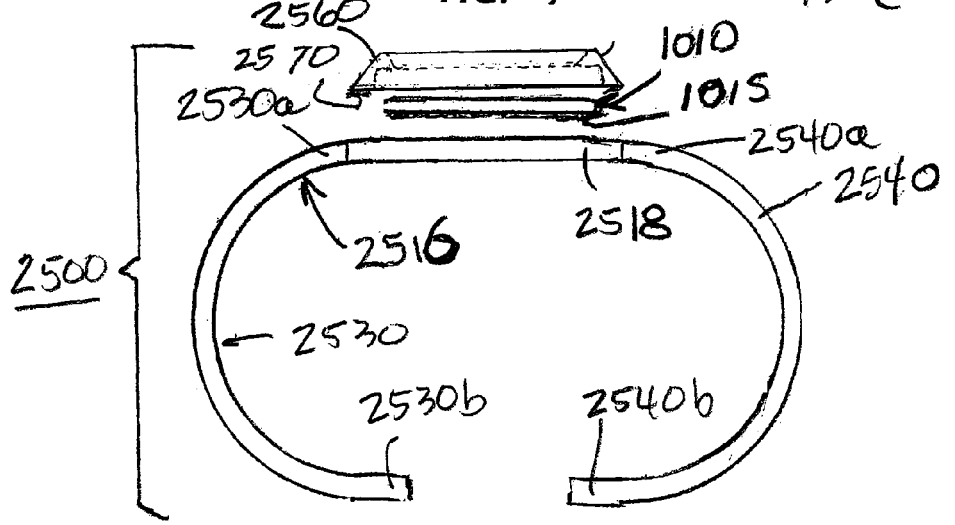
FIG. 8 is a side elevation exploded view of a fifth alternate embodiment, exemplary wristband of the present invention.

FIG. 8 depicts in an exploded view, a fifth alternate embodiment RFID wristband type personal identification device of the present invention designated generally at 2500 with a planar RFID element 1010 and a carrier including a one piece body 2516 with an enlarged central portion 2518 forming a bottom of holder portion 2520 and a pair of straps 2530 and 2540 each having a first end 2530a, 2540a secured, preferably fixed and integral with the enlarged central portion 2518 of holder 2520 and a second, "free" end 2530b, 2540b distal to the holder. The band 2516 is formed, preferably molded, with central portion 2518, loop 2420c and with straps 2530, 2540 in one continuous unbroken piece from a thermoplastic material that is resiliently flexible at ambient temperatures. The straps 2530, 2540 retain a curved shape from molding and are resiliently flexible to permit them to be spread apart from an original, molded configuration for application to a user's wrist and to retract to or towards their original configuration to releasably secure the device 2500 them to the user's wrist.

FIG. 8 also depicts certain structures and methods of fabrication that might be used in making wristbands of the present invention. The enlarged portion and straps of the first three alternate embodiments 2100, 2200, 2300, as well as some embodiments to be described, suggestly would be molded monolithically in one continuous body or band of a thermoplastic material that is at least flexible if not elastic at ambient temperatures. For example, the RFID element 1010 can be fixed directly to the surface of the enlarged portion 2518 forming the base of a holder portion 2520 by an adhesive layer 1015 or, depending upon the material forming the exterior of the element 1010, a solvent or thermal weld (neither depicted). In another possible method of fabrication, the RFID element 1010 is operably connected and preferably fixedly secured to the body 2516 by means of a bezel-like retaining ring 2560 which is itself separately fabricated and secured to the enlarged portion 2518 of body 2516 over the RF10 element 1010 by suitable means. On the one hand, the securement joining the ring 2560 to the enlarged portion 2518 of the holder may be adhesive layer indicated generally at 2570 or a solvent or heat weld (not depicted) or a mechanical securement such as mating threads, snap fit contours, post and hole structures on the holder and ring and/or separate mechanical fasteners such as screws, rivets or the like (none of the latter being depicted). If desired, the attachment portion and holder portions of the previous alternate embodiments 2100, 2200, 2300, 2400 could be molded as one continuous integral piece from elastomeric material.

Figure 9:
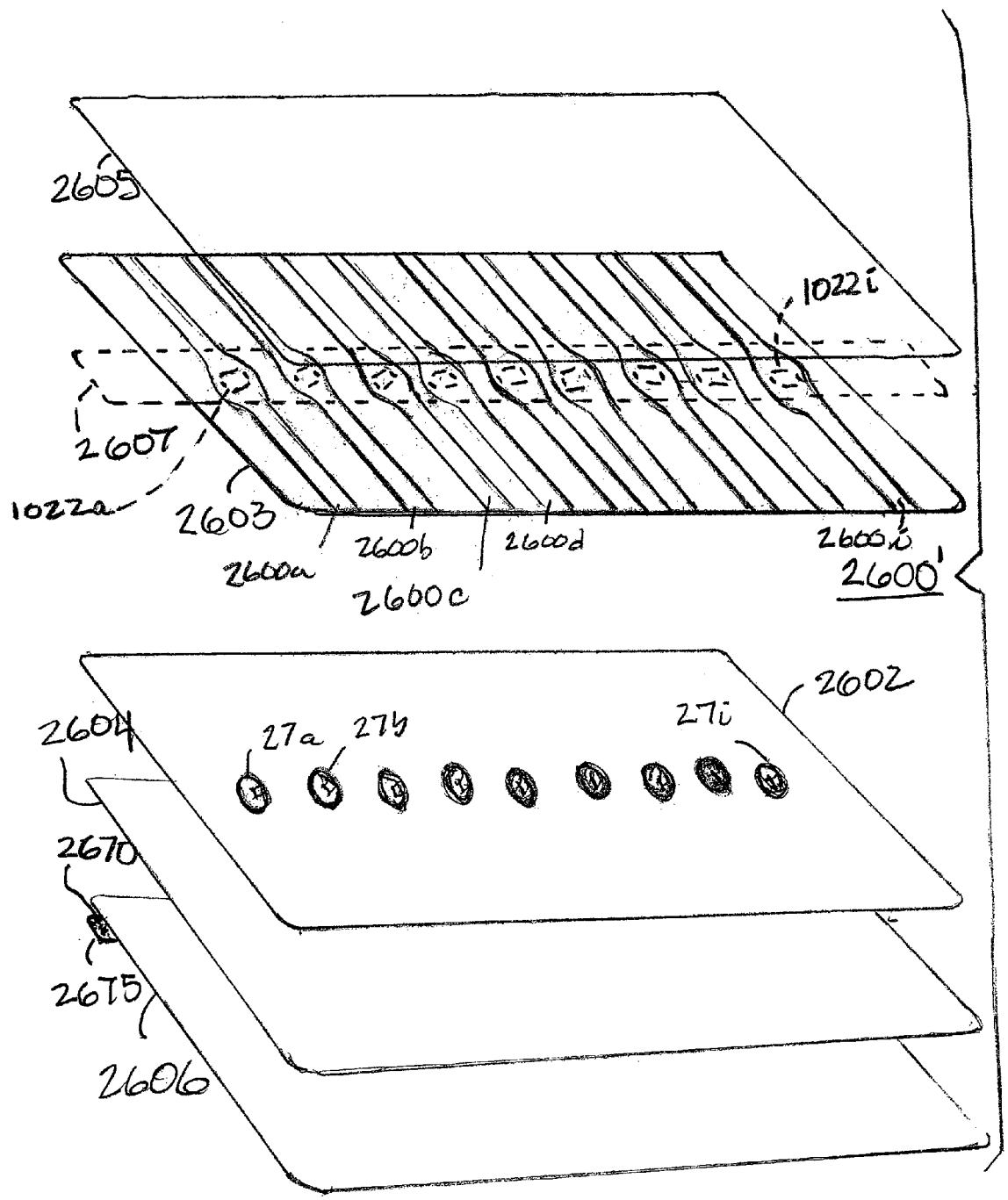
FIG. 9 depicts a printed sheet product construction for sixth alternate embodiment wristbands of the present invention.
Figure 10:
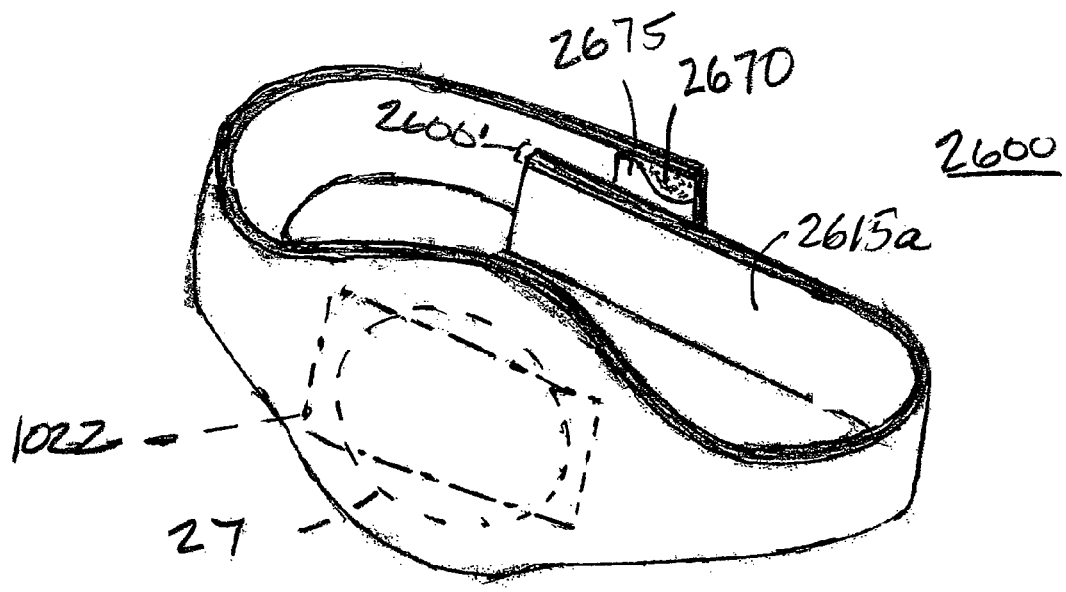
FIG. 10 is a perspective view of one of the wristbands of the sheet product of FIG. 9.

FIGS. 9-10 depicts a sixth alternate embodiment RFID wristband configuration and still another method of fabrication. An individual wristband 2600 (FIG. 10) is formed in one piece with a plurality or set of similar bands from a lamination of flexible sheet elements and RFID components indicated collectively at 2600' in FIG. 9. A first sheet portion 2602 is formed of a porous, preferably microvoided, thermoplastic material that will collapse around the RFID circuit under heat and pressure typically employed in the lamination of the various sheets together. A plurality of individual RFID transponder circuits 27a, 27b, . . . 27i, etc. are sealed between the first sheet portion 2602 and a second sheet portion 2603. The first and second sheet portions may be halves of a single sheet folded between its side edges so as to overlap with the RFID components 27 located between the facing halves. Alternately, the second sheet portion 2603 may be separate from the first sheet portion 2602 as shown in FIG. 9 and may be the same microvoided thermoplastic material or made of an entirely different plastic material that can be bonded to the first sheet portion 2602. If desired, a reinforcement layer 2604 of a strong yet readily flexible material such as stretched tetrafluoroethylene (e.g. Tyvek®) or other axially oriented polymer sheet material or a layer of para-aramid or glass fiber is bonded with one of the two sheet portions (e.g. 2602) if it is not used directly as the second sheet portion 2603. Flexible sheets 2602 and 2603 (with sheet 2604 if provided) constitute a core. Preferably, a transparent, readily flexible layer 2605 may be provided over one outer side of the sheet portion 2603 that is intended to be exposed on the wristband (i.e. 2603) as a first cover sheet to protect that exposed surface and any printing that might be provided on that surface. If desired, another flexible, transparent sheet 2606 may be provided over the remaining outer side of sheet 2602 and over the reinforcement layer 2604, if provided as a second coversheet. This might be done if it were desired to make the major outer sides of the wristbands 2600 look the same or for user comfort or durability. Alternatively, a metalized plastic sheet may be substituted as the bottom most sheet 2602/2604/2606 to provide the exposed bottom side 2615a (FIG. 10) of the resultant device 2600 where the metal can preferably face the skin of the user. Such metalized inner surface can be provided on any other embodiment of the invention or either the back of the planar RFID element 1010 or, more preferably, on the inner side of the carrier portion. A more resilient layer 2607 (in phantom) can also be further provided over one side of the central holder portion 2620 to reinforce that portion of the device 2600 against flexing and protect the RFID 27 components in the holder portion 2620 (FIG. 10). While it is shown over sheet 2603, it can just as easily be positioned under sheet 2602 or 2604. Finally, while any fastening may be used to secure the free ends 2630b, 2640b of the first and second straps 2630 and 2640, it is suggested that a layer of contact adhesive 2670 on a removable release strip 2675 be provided on the outermost one of the sheets 2602-2606 so that it ends up on the outer surface of one of the straps (e.g. 2630, 2640).

After assembly and lamination, the resulting printed sheet product 2600' is scored to form a plurality of individual wristbands 2600a, 2600b, ..., 2600i, etc., each with its own unique RFID assembly 27a, 27b, ..., 27i, etc., having its own unique transponder code. It may also bear its own printed image 1022 (1022a, ... 1022i in FIG. 9) which, again, might be a bar or alphanumeric code unique to each individual wristband 2600a, 2600b, ..., 2600i, or both, or a logo or other static field(s) indicia or a combination of unique printed code field(s) with common static indicia field(s). While a sheet product 2600' is shown in FIG. 9, it will be appreciated that continuous webs forming layers 2602-2606, including a continuous web supporting transponders 27a for positioning between the sheets or webs 2602, 2603, can be provided along with continuous strip(s) 2607 and/or 2670/2675 for making long webs of multiple wristbands 2600 at one time.

Figure 11:
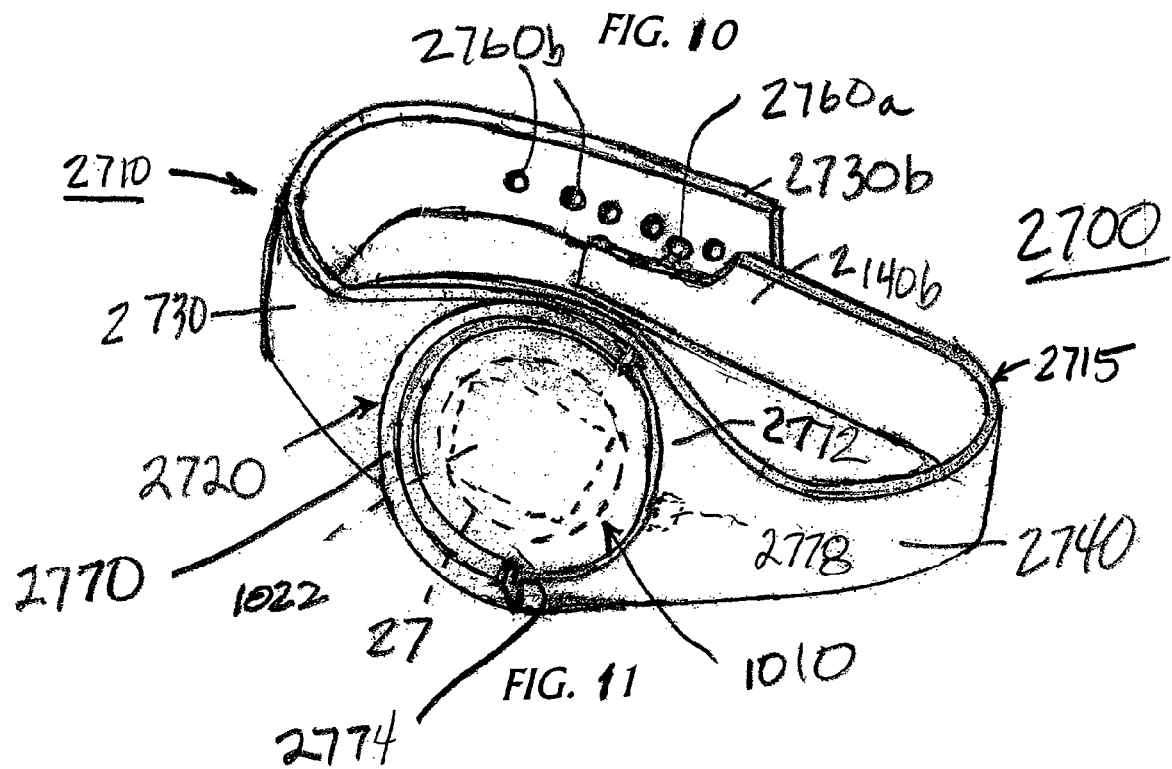
FIG. 11 is a perspective view of a seventh alternate embodiment wristband of the present invention.

FIG. 11 depicts a seventh alternate embodiment RFID wristband type personal identification device of the present invention indicated generally at 2700 including a planar RFID element 1010 and carrier indicated generally at 2710. Carrier 2710 includes a holder portion 2720 and an attachment portion 2715 with straps 2730, 2740. This embodiment includes RFID element mounting and a strap securement which might be used with other securements and mountings, respectively, being disclosed in other embodiments All of the holder portions disclosed in prior FIGS. 3-8 had retaining rings that were integrally formed with the holder portion or attached to it in assembly (like FIG. 8) but which, in any case, surrounded or essentially surrounded the RFID element 2110. The retainer structure need not surround or essentially surround or even substantially surround the outer perimeter of the RFID element 1010. FIG. 11 shows a curved retainer structure 2770 that is approximately C shaped having a recessed channel 2774 and an open side 2772 into which the RFID element 1010 can be slid. The RFID element 1010 can be held in place by an adhesive or simply friction with the channel 2774 and/or by extending the structure 2770 for an angle of slightly more that 180 degrees around the element 1010 so as to create a pinch point at the open side 2772 or by the provision of a stop member 2778 (diagrammatically, in phantom) in the holder portion, for example, a wedge forming a ramp surface leading into the retainer structure 2770. The free strap ends 2730b, 2740b of straps 2730, 2740 are adjustably secured together by a fastening including a molded post 2760a mating with any of the plurality of holes 2760b.

Figure 12:
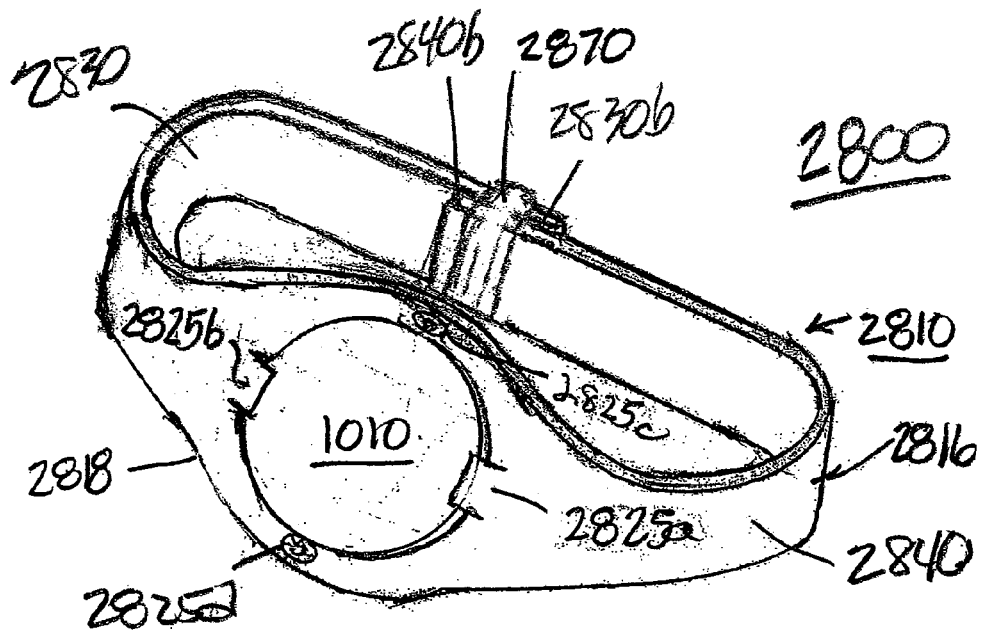
FIG. 12 is a perspective view of a eighth alternate embodiment wristband of the present invention.

FIG. 12 is a perspective view of an eighth alternate embodiment RFID wristband type personal identification device of the present invention indicated generally at 2800. Device 2800 includes planar RFID element 1010 in a carrier 2810 including one-piece body 2816 with enlarged central portion 2818 and integral straps 2830, 2840. Wristband 2800 incorporates two more possible variations in wristband construction. First, the planar RFID element 1010 is held on the holder portion 2820 by the provision of a plurality of individual retainers 2825a, 2825b optionally with one or more stops 2825c and 2825d all preferably formed integrally with enlarged portion 2818 to define the holder portion 2820 and spaced around the RFID element 1010. The retainers (collectively 2825) may be resiliently flexible and provided with channels along their bases so that edges of the RFID element 1010 may be slid into them after riding over one of the stop elements 2825c, 2825d. Second, the free ends 2830b, 2840b of straps 2830, 2840 may be held together by a fastening in the form of a separate mechanical fastener indicated generally at 2870. The fastener 2870 can be a wrap, for example, of tape as depicted, or any of a variety of spring clips or clamps or any other clips or wraps that will compress or can be compressed or crushed around the joined free ends 2830b, 2840b.

Figure 13:
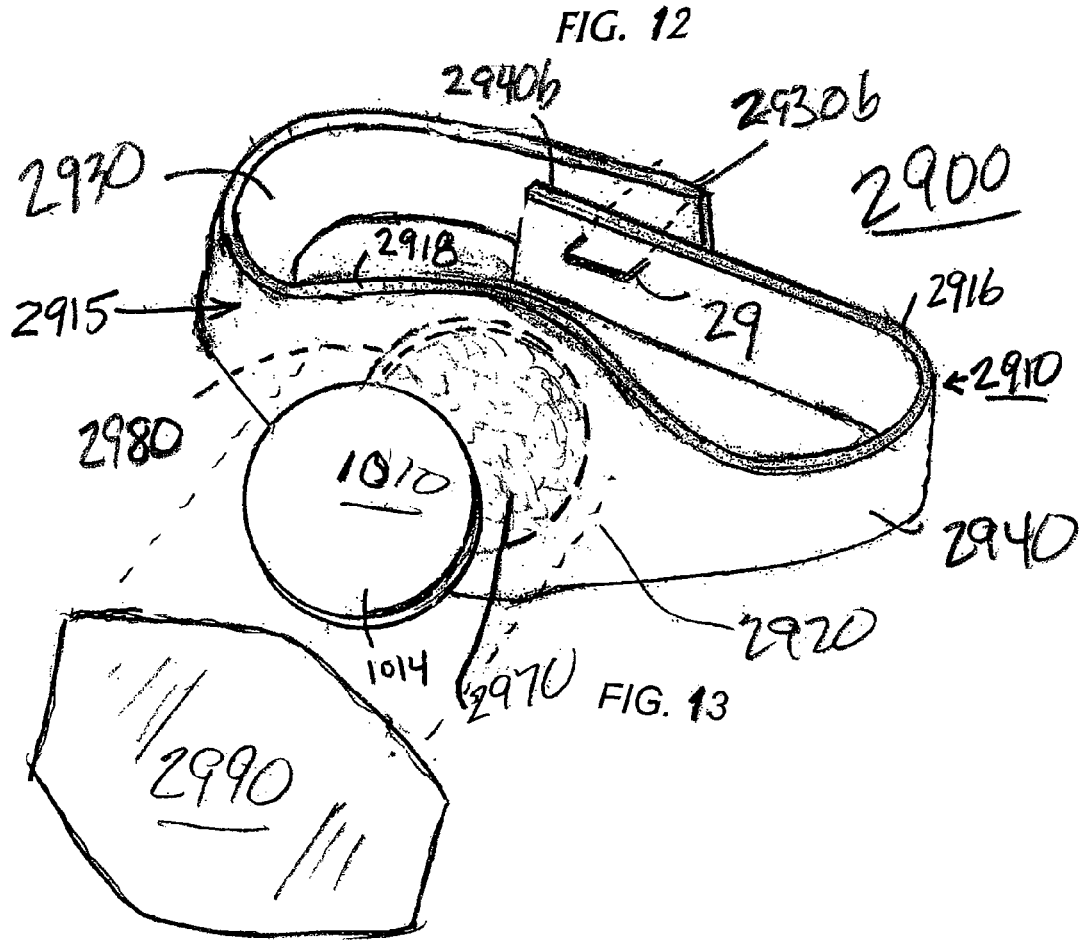
FIG. 13 is a perspective view of a ninth alternate embodiment wristband of the present invention.

FIG. 13 is a perspective view of an ninth alternate embodiment RFID wristband type personal identification device of the present invention indicated generally at 2900 with carrier portion 2910 and planar RFID element 1010. Wristband 2900 also incorporates two more possible variations in wristband construction. Again, carrier 2910 has an attachment portion 2915 provided by a single body 2916 with enlarged central portion 2918 and integral straps 2930, 2940. First, the planar RFID element 1010 is held on the holder portion indicated generally 2920 by the provision of an adhesive layer 2970 (indicated by shading). If desired, a recess 2980 (in phantom) can be provided in the holder portion 2920 to receive the RFID element and the adhesive layer 2970. Alternatively, the RFID element 1010 can be adhered to the holder portion 2920 (with or without recess 2980) by a length of adhesive tape 2990, preferably sufficiently transparent to read any printing on the exposed major planar surface of RFID element 1010, or bearing printing itself and secured to the enlarged portion 2918 of body 2916 in the holder portion 2920 over the element 1010. Alternatively, RFID element 1010 might be secured to the body 2816 by a cover layer of a transparent epoxy material. Second, the free ends 2830b, 2840b of individual straps 2830, 2840 are held together by another type of fastening, a separate, conventional mechanical fastener 2970 such as a staple (depicted) or a rivet or swaged stake(s) or nut and screw, (none depicted), etc., passed through one or both of the overlapped ends 2930b, 2940b.

Figure 14:
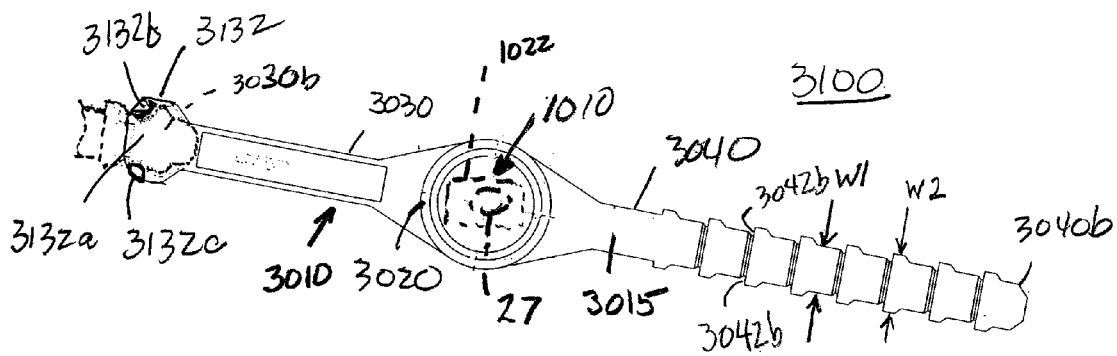
FIG. 14 is a plan view of a tenth alternate embodiment wristband of the present invention.

FIG. 14 depicts diagrammatically a tenth alternate embodiment RFID wristband type personal identification device of the present invention indicated generally at 3100. The tenth alternate embodiment 3100 is substantially identical to the preferred embodiment of FIGS. 1-2 having many of the same features with similar reference numbers. Fastening element 3132 at the free end 3030b of its strap 3030 is different. A channel 3132a is provided between a pair of raised stops 3132b, 3132c. The channel 3132a is sufficiently wide to receive the narrowest width W1 of the strap 3040 but narrower than the widest width W2 so that the stops 3132*b*, 3132*c* contact and hold and preferably wedge an opposing pair of the transverse end surfaces 3042*b*.

Figure 15:
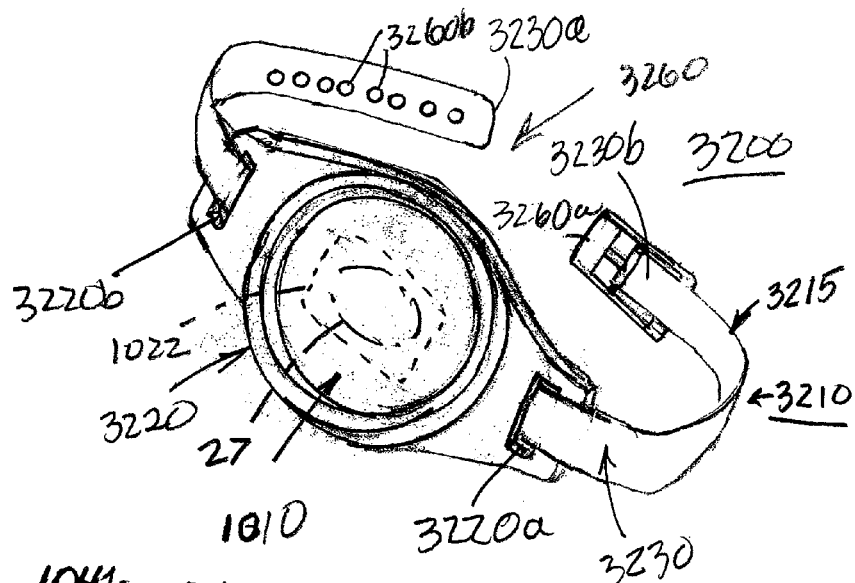
FIG. 15 is a perspective view of an eleventh alternate embodiment wristband of the present invention.

FIG. 15 depicts diagrammatically an eleventh alternate embodiment RFID wristband type personal identification device of the present invention indicated generally at 3200. Wristband 3200 has a carrier 3210 that comprises a separate holder portion 3220 and a separate attachment portion 3215 in the form of a separate single strap 3230, one end 3230*a* of which can be threaded through the loops 3220*a*, 3220*b* provided on opposite edges of the holder portion 3220. The strap 3230 can be of any construction with any fastening 3260 at its free ends 3230*a*, 3230*b*. One possible type of fastening 3260 is conventional buckle 3260*a* and holes 3260*b* formed into the strap 3230 itself.

Figure 16:
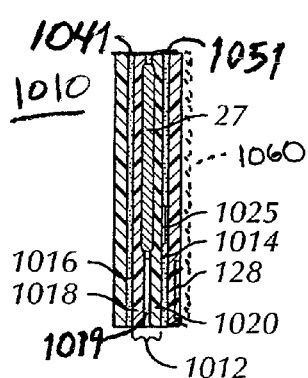
FIG. 16 is a cross-sectional view of an exemplary individual radio frequency identification element.

FIG. 16 is a cross sectional view of a presently preferred individual planar radio frequency identification (RFID) element 1010 of the previous FIGS. 1-8 and 11-15. Element 1010 includes a preferably planar and printable, flexible core indicated generally at 1012 having opposing first and second major planar outer sides 1014 and 1016, a first major planar outer side 1014 being partially seen in various previous figures. Core 1012 is preferably provided by separate first and second printable core strips 1018, 1020 which are planar, flexible and accept printing, and suggestedly at least one of which is a porous polymer sheet material, more particularly a microvoided polymer and preferably a microvoided polysilicate sheet material. The core strips 1018, 1020 are overlapping and coextensive in the element 1010. Core strips 1018, 1020 can be joined together with and by any means suitable for the materials selected and as intended, preferably by an adhesive layer 1019 or by direct welding. Sandwiched between the core strips 1018, 1020 is a radio frequency transponder assembly 27, which is permanently and integrally fixed together with at least one and preferably each of the core strips 1018, 1020 between the core strips 1018, 1020. As will be explained, assembly 27 includes circuit portion 29 (FIG. 17) containing the unique electro/magnetic transponder code. Preferably, first and second cover strips 1040, 1050 are again provided integrally and permanently secured to the first and second outer facing major sides 1014, 1016, of the core 1012 and respectively of the first and second core strips 1018, 1020, by suitable means such as adhesive layers 1041, 1042. Each cover strip 1040, 1050 preferably is transparent and extends at least transversely entirely across the individual sheet element 1010 on the first and second major planar sides 1014, 1016, respectively, of strips 1018, 1020 of the core 1012 cover strips 1040, 1050 might be polyester (PE), poly vinyl choloride (PVC), polyethylene terephthalate (PET) or a polycarbonate material. A metalized layer 1060 might be provided directly on cover strips 1050 or attached afterwards.

Suggestedly, at least one of the core strips 1018, 1020 comprises and, preferably consists essentially of a porous polymer sheet material that accepts printing, more specifically at least laser printing. More preferably, one or both core strips 1018, 1020 is essentially of a sheet of porous, specifically microvoided or microporous, polymer sheet material such as Teslin® of PPG Industries, Pittsburgh, Pa., or Artisyn® of Daramic, Inc., Charleston, S.C., both microvoided (i.e. microporous), sheet materials, for laser printing. Teslin® is described in detail in U.S. Pat. No. 4,861,644, incorporated by reference herein. See also published U.S. Application No. 2001 0023014 also incorporated by reference herein. For the microporous polymer sheet materials described in U.S. Pat. No. 4,861,644, the pores constitute at least about thirty-five percent by volume of the microporous material substrate and the volume average diameter of the pores is less than one hundred micrometers, generally in the range of from about 0.02 to about 50 micrometers. Teslin® is relatively very porous with a porosity of more than fifty percent. Preferably the microvoided or microporous Teslin® polysilicate sheet materials are permanently bonded together with a layer 1019 of suitable adhesive material such as WC9-PL, a heat activated, water based polyurethane adhesive of the Thornley Company of Wilmington, Del.

The microvoided sheet material is superior to non-voided materials used in all other known examples of encasing RFID transponder assemblies in plastic tags because the material readily collapses over the assemblies when the individual sheet products are heated and pressed to laminate them without damage to the assemblies. Double sheet constructions like elements 1010, were made using seven mil thick Teslin®. The presence of the aforesaid RFID transponder assemblies 27 in these individual sheet products with two core strips could not be felt, the microvoided material essentially collapsing and possibly flowing around the assemblies where the assemblies were present between the sheets. In contrast, when bonded between sheets of conventional polymer card stock such as PVC or PE, which lack natural voids, a cavity has to be made to receive the RFID assembly or a lump is created when the sheet(s) are(is) bonded to the RFID assembly. The microvoided sheet products of the present invention further bond together better than the conventional polymer sheet stock, it is believed because the adhesive penetrates the porous sheet better than the conventional polymer card sheet stock, which is essentially without voids. The same is true for bonding of any outer protective cover sheet(s) directly to the microvoided core material. Note, where outer cover sheets are bonded over the printed outerside of a core made from these preferred micoporous material sheets, attempted removal of the cover sheet will tend to tear apart the core, destroying or at least distorting the printing, an added security feature. The microvoided products are "softer" and less brittle. As a result identification elements tend not to peel, crack or break in extended use like conventional PVC cards. This softer material transfers less pressure and stress to the transponder assemblies 27 when the removable identification elements are flexed during normal use. It has been further found that at least the preferred microvoided polymer materials affords faster static decay and is static dissipative compared with other, conventional, nonporous materials sometimes used in RFID tags and labels, including PVC, PET, and PC. This has been found to increase the range of Ultra High Frequency (UHF) transponder assemblies 27 up to about twenty percent.

As previously noted with respect to FIGS. 1 and 2, at least one and, more typically, a plurality of spaced-apart, variable data fields, e.g., 1024 and 1025, are printed on the core 1012 with a unique, multi-digit printed codes which are preferably identical to one another. In addition to the variable data fields 1024, 1025, etc., the printed sheet element 1010 may include one or more static graphic fields with an individual static graphic field 1034 being identified on side 1014. It should be appreciated that this does not preclude a static graphic field from differing in appearance from element to element as where a large overall static design is applied to blocks of the individual elements 1010 so that no static graphic field on elements adjoining each other when being made is the same. However, such different static graphics fields carry no information unique to the element which could be used to uniquely identify the element or the user to whom the element is uniquely assigned.

Figure 17:
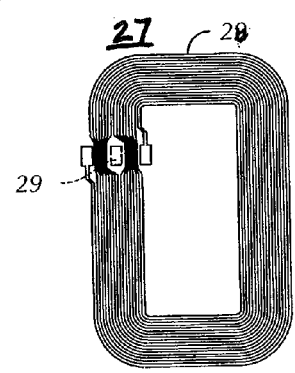
FIG. 17 is a plan view of a radio frequency transponder assembly as might be used in the individual identification elements and devices of the present invention.

Individual radio frequency identification elements 1010 include a generally planar, ultra high frequency, passive, radio frequency identification ("RFID") transponder assembly 27 configured to transmit an electro/magnetic signal containing a unique electro/magnetic code and possibly other information in response to a radiated, e.g., radio frequency ("RF") polling or interrogation signal. Referring to FIG. 17, such RFID assemblies 27 include an antenna 28 and a small chip 29 connected to the antenna. The chip 29b includes a memory containing the unique electro/magnetic code, as well as transponder circuitry and a power circuit configured to temporarily store energy from the received RF polling/interrogation signal and use that energy to transmit the RF response. UHF assemblies 27 may also include programmable (random access) memory and control circuitry. The assembly 27 is preferably permanently and integrally fixed together within the core 1012 or with at least one of the core 1012 and the first cover strip 1040, if provided. The electro/magnetic transponder assembly 27 may be first "tacked" to the core 1012 before the core 1012 is joined with the first cover strip 40 or, preferably, to a side of one of the core strips 1018, 1020 facing the other case strip, before those strips are joined so as to be encapsulated between the strips 1018, 1020 as shown. Such RFID assemblies 27 (also sometimes referred to as "inlays") are available from a variety of suppliers, including but not limited to, Motorola of San Diego, Calif.; Texas Instruments of Attleboro, Mass., Checkpoint Systems of Thorofare, N.J.; Gemplus Corp. of Redwood City, Calif.; Hughes Identification Devices of Tustin, Calif.; Cotag International of Wilmington, Del.; Abbhafo Incorporated of San Diego, Calif.; and Balough T.A G. of Ann Arbor, Mich. For example, Gemplus offered smart labels in three shapes: a small square approximately one-half inch square, a large square approximately one inch square and a small disk permitting their incorporation into an element 1010 only slightly larger. All three sizes come in two versions, read-only and read/write. Each read-only version contains a unique, tamperproof code of sixty-four bits, which is directly programmed during manufacture. The read/write version has a 2 kb EEPROM memory that offers different access possibilities.

It also has been found possible to print by silk screen, electrically conductive inks/toners on at least one microvoided polymer plastic, the aforesaid Teslin® microvoided polysilicate thermoplastic material. More particularly, at least the antenna portions 28 of RFID transponder assemblies 27 can be printed leaving only the transponder chip 29 to be obtained from an outside source and applied. The chip 29 may be mounted on a holder (not depicted) to span the antenna 28. Chips can be obtained from the previously identified manufactures and applied automatically with "pick and place" equipment now commercially available from different manufacturers and /or distributors including but not limited to Mulbauer, a German company with a place of business in Newport News, Va. Mulbauer models TAL 4000, TMA 6000 and FCM 6000 can be considered to perform this task. The ability to silkscreen inks/toners directly on a microvided polymer sheet material layer 1018 or 1020 like Teslin® makes manufacture of the planar ID elements easier. The preexisting antenna designs and geometries supplied by RFID assembly suppliers do not always fit the desired geometry of the ID element or where they do fit, they may be in relatively tight registration. Even slight misalignment can result in the die cutting of an RFID assembly or its antenna when the individual ID elements are cut from larger sheets they are made in. Being able to print antennas provides manufacturing flexibility for antenna layout and design including size, shape and frequency characteristics and scheduling because end users will no longer have to await the supply of assemblies by manufacturers, where significant delays have occurred. Furthermore, the technique of applying an entire RFID assembly previously described utilizes a bed of wet glue on the substrate to receive and hold the assembly.

Other specific manufacturing details and materials, including suggested materials and manufacturing techniques, as well as other configurations of printed sheet products including planar, printed identification elements have been disclosed in prior U.S. Pat. Nos. 4,978,146, 5,495,981 5,743,567, 5,769,457, 5,863,076, 6,010,159 and/or 6,039,356, and Application Nos. 60/882,623 filed Dec. 29, 2006, Ser. No. 09/532,113 filed Mar. 21, 2000, and Ser. No. 09/595,825 filed Jun. 16, 2000, each of which is incorporated by reference herein in its entirety.

It will be appreciated by those skilled in the art that changes could be made to the embodiments described above without departing from the broad inventive concept thereof. In particular any of the holder portion constructions can be combined with any of the strap and strap securement constructions disclosed. Also, while bands are the preferred form, the personal RFID element carrier may be of any other form by which the element may be attached to the user. It is understood, therefore, that this invention is not limited to the particular embodiments disclosed, but it is intended to cover modifications within the spirit and scope of the present invention.

The invention claimed is:

1. A personal identification device comprising:
a planar radio frequency identification element, the element including a flexible core having opposing first and second major opposing outer sides and formed from at least one strip of a flexible, porous polymer sheet material, and a planar radio frequency transponder assembly permanently and integrally fixed with at least an inner major side of the flexible, porous polymer sheet material, the at least one porous polymer sheet material core strip varying in thickness in the element, the at least one flexible, porous polymer sheet material core strip being thinned over the planar radio frequency transponder assembly in comparison to thicknesses of the at least one flexible, porous polymer sheet material core strip adjoining the planar radio frequency transponder assembly; and
carrier means configured for holding the planar radio frequency identification element and for releasably securing the planar radio frequency identification element to a user to be identified by the planar radio frequency identification element.

2. The personal identification device of claim 1 wherein the at least one strip of flexible, porous, polymer sheet material is a microvoided sheet material having a porosity of greater than fifty percent.

3. The personal identification device of claim 2 wherein the core includes a second core strip of flexible, printable polymer sheet material having an inner major side facing and overlying the inner major side of the flexible, microvoided, polymer sheet material and the planar radio frequency transponder assembly, the second core strip being permanently and fixedly joined with the inner major side of the at least one strip of flexible, microvoided, polymer sheet material, sealing the planar radio frequency transponder assembly between the at least one strip of the flexible, microvoided, polymer sheet material and the second core strip.

4. The personal identification device of claim 3 wherein the second core strip of planar, flexible, printable sheet material is a second sheet of microvoided, sheet material having a porosity greater than fifty percent.

5. The personal identification device of claim 1 further comprising a first flexible transparent non-porous cover strip integrally and permanently secured to the first outer side of the core, the first cover strip being coextensive with the first outer side of the core.

6. The personal identification device of claim 5 further comprising a unique code printed on a visible outer major planar face of at least one of the core and the first flexible transparent cover strip to uniquely identify the planar identification element from all other planar identification elements.

7. The personal identification device of claim 5 further comprising a metallic layer located on the device between the planar radio frequency identification element and the user.

8. The personal identification device of claim 1, where the planar radio frequency identification element is integral with the carrier means, the at least one strip of flexible, porous polymer forming part of the carrier means and being of a length sufficient to wrap around a portion of a user to secure the device to the user.

9. The personal identification product of claim 1, further comprising a metalized layer as a side of one of the element and the carrier means facing the user with the device secured to the user.

10. The personal identification device of claim 1 wherein the opposing first and second major opposing outer sides of the core are planar and parallel, wherein the planar radio frequency transponder assembly includes an antenna connected with circuit portion, and wherein the at least one strip of flexible, porous, polymer sheet material is a microvoided sheet material having opposing planar parallel major sides at least before incorporation into the device and a porosity of greater than fifty percent formed by microvoids.

11. A method of making an RFID personal identification device comprising the steps of:
providing an at least generally planar RFID element including first and second opposing major planar outer sides with indicia printed on at least one of the outer sides; and
providing an attachment portion with a holder portion sufficiently large to contain the RFID element and at least one strap with one securement capable of holding the holder portion on a user's wrist;
wherein the step of providing a planar RFID element comprises the steps of:
providing a first planar substrate sheet having major opposing first and second sides;
applying a first one of either a radio frequency identification array antenna and a radio frequency identification array printed circuit chip to the first major side of the first planar substrate sheet;
separately applying a second remaining one of the radio frequency identification array antenna and the radio frequency identification array printed circuit chip to the first major side of the first planar substrate sheet in operative overlying relationship and connection with the first one to form an operative radio frequency identification array on the first planar substrate sheet;
fixedly and permanently joining a first major outer side of a second planar substrate sheet to the first major side of the first planar substrate sheet overlying the applied antenna and printed circuit chip to form at least part of a multilayer planar core having first and second major outer sides, at least one of the first and second planar substrate sheets being microvoided;
fixedly and permanently applying at least a first planar cover sheet to at least the first major outer side of the planar core; and
scoring the planar core and at least first planar cover sheet to define at least one multilayer, integral, individual planar radio frequency identification element removable from the core and at least first planar cover sheet, the planar radio frequency identification element containing the operative radio frequency identification array and the planar radio frequency identification element having opposing major planar sides fitting into an area no greater than about three and five-eighths by about two and three-eighths inches.

12. The multilayer, integral, individual planar identification element made by the method of claim 11.

13. The method of claim 11 further comprising the step of printing on the second major side of the second planar substrate sheet before the fixedly and permanently joining step.

14. The method of claim 11 further comprising the step of printing on the second major side of the first planar substrate sheet before the step of applying the first cover sheet.

15. The method of claim 14 wherein the step of printing on the second major side of the first planar substrate sheet occurs before the step of applying a first one.

16. The method of claim 14 wherein the step of printing on the second major side of one of the first and second planar substrates includes printing a unique machine readable code.

17. The method of claim 11 wherein at least both of the first and second planar flexible sheets are microvoided material sheets.

18. The method of claim 11 further comprising the step of providing a metalized layer on one of the RFID element and the attachment portion on a side to be facing the user with the device secured to the user.

19. A method of making an individual planar radio frequency identification device comprising the steps of:
providing a first planar substrate sheet having major opposing first and second sides;
applying a first one of either a radio frequency identification array antenna and a radio frequency identification array printed circuit chip to the first major side of the first planar substrate sheet;
separately applying a second remaining one of the radio frequency identification array antenna and the radio frequency identification array printed circuit chip to the first major side of the first planar substrate sheet in operative overlying relationship and connection with the first one to form an operative radio frequency identification array on the first planar substrate sheet;
fixedly and permanently joining a first major outer side of a second planar substrate sheet to the first major side of the first planar substrate sheet overlying the applied antenna and printed circuit chip to form at least part of a multilayer planar core having first and second major outer sides, at least one of the first and second planar substrate sheets being microvoided; and
scoring the planar core to define at least one multilayer, integral, individual planar radio frequency identification wristband removable from the core, the planar radio frequency identification wristband including a central holder portion containing the operative radio frequency identification array and the planar radio frequency identification element and a pair of straps extending away from opposite sides of the holder portion.

20. The device formed by the method of claim 19.

21. A personal identification device comprising:
a planar radio frequency identification element, the element including a flexible core having opposing first and second major planar parallel polymer opposing outer sides, the core being formed from at least a first strip of a flexible, porous polymer sheet material and a second strip of a flexible polymer sheet material, and a planar radio frequency transponder assembly including an antenna operably connected with a circuit portion and being permanently and integrally encapsulated between the first and second strips and fixed with at least an inner major side of the first strip of flexible, porous polymer sheet material, the first strip of flexible, porous polymer sheet material having a porosity greater than fifty percent formed by microvoids in the sheet material; and carrier means configured for holding the planar radio frequency identification element and for releasably securing the planar radio frequency identification element to a user to be identified by the planar radio frequency identification element.

\* \* \* \* \*